United States Patent [19]

Earhart, Jr. et al.

[11] Patent Number: 5,883,486
[45] Date of Patent: Mar. 16, 1999

[54] APPARATUS AND METHOD FOR SOFT-STARTING A THREE-PHASE MOTOR

[75] Inventors: Walter Earhart, Jr., La Crosse, Wis.; Dwayne L. Johnson, La Crescent, Minn.; Rolf M. Hanson, Onalaska, Wis.

[73] Assignee: American Standard Inc., Piscataway, N.J.

[21] Appl. No.: 9,092

[22] Filed: Jan. 20, 1998

[51] Int. Cl.[6] .................................................. H02P 1/26
[52] U.S. Cl. ........................................................ 318/778
[58] Field of Search .................................. 318/362, 445, 318/452, 508–520, 767–798, 437

[56] References Cited

U.S. PATENT DOCUMENTS

| | | | |
|---|---|---|---|
| 3,122,693 | 2/1964 | Hermansdorfer | 318/778 |
| 3,573,580 | 4/1971 | Shinozaki | 318/778 |
| 3,742,370 | 6/1973 | Hansen | 318/778 |
| 3,805,133 | 4/1974 | Hatakeyama et al. | 318/761 |
| 4,123,000 | 10/1978 | Miller | 236/11 |
| 4,459,535 | 7/1984 | Schutten et al. | 318/808 |
| 4,492,911 | 1/1985 | Molitor | 318/779 |
| 4,761,602 | 8/1988 | Leibovich | 318/816 |
| 4,959,573 | 9/1990 | Roberts | 310/68 R |
| 5,065,305 | 11/1991 | Rich | 363/150 |
| 5,068,559 | 11/1991 | Satake et al. | 310/112 |
| 5,218,283 | 6/1993 | Wills et al. | 318/748 |

*Primary Examiner*—Jonathan Wysocki
*Attorney, Agent, or Firm*—William J. Beres; William O'Driscoll; Peter D. Ferguson

[57] ABSTRACT

An apparatus and method for soft-starting a three-phase motor for connection to a three-phase power source for driving a three-phase motor. Soft-start provides a way to reduce the amount of starting torque and current during starting conditions. First, second, and third conductors are connected between a three-phase power source and a three-phase motor. A power contactor interrupts and provides current along the three conductors. A phase-shifting element for shifting the phase of the power signal normally outputted from the first conductor to match the phase of the power signal normally outputted from the third conductor is connected between the first and third conductors. A switching apparatus having first and second switch elements is connected between the phase-shifting element and the third conductor. When the first switch element is closed, current flows from the first conductor to the motor via the phase-shifting element. When the second switch element is open, no current flows from the third conductor to the motor directly. In this mode, the motor is running on single-phase power. When the states of the first and second switch elements are flip-flopped, the motor runs on three-phase power. The first and second switch elements' states are controlled by a control element which energizes the switching apparatus upon the occurrence of a triggering event.

20 Claims, 1 Drawing Sheet

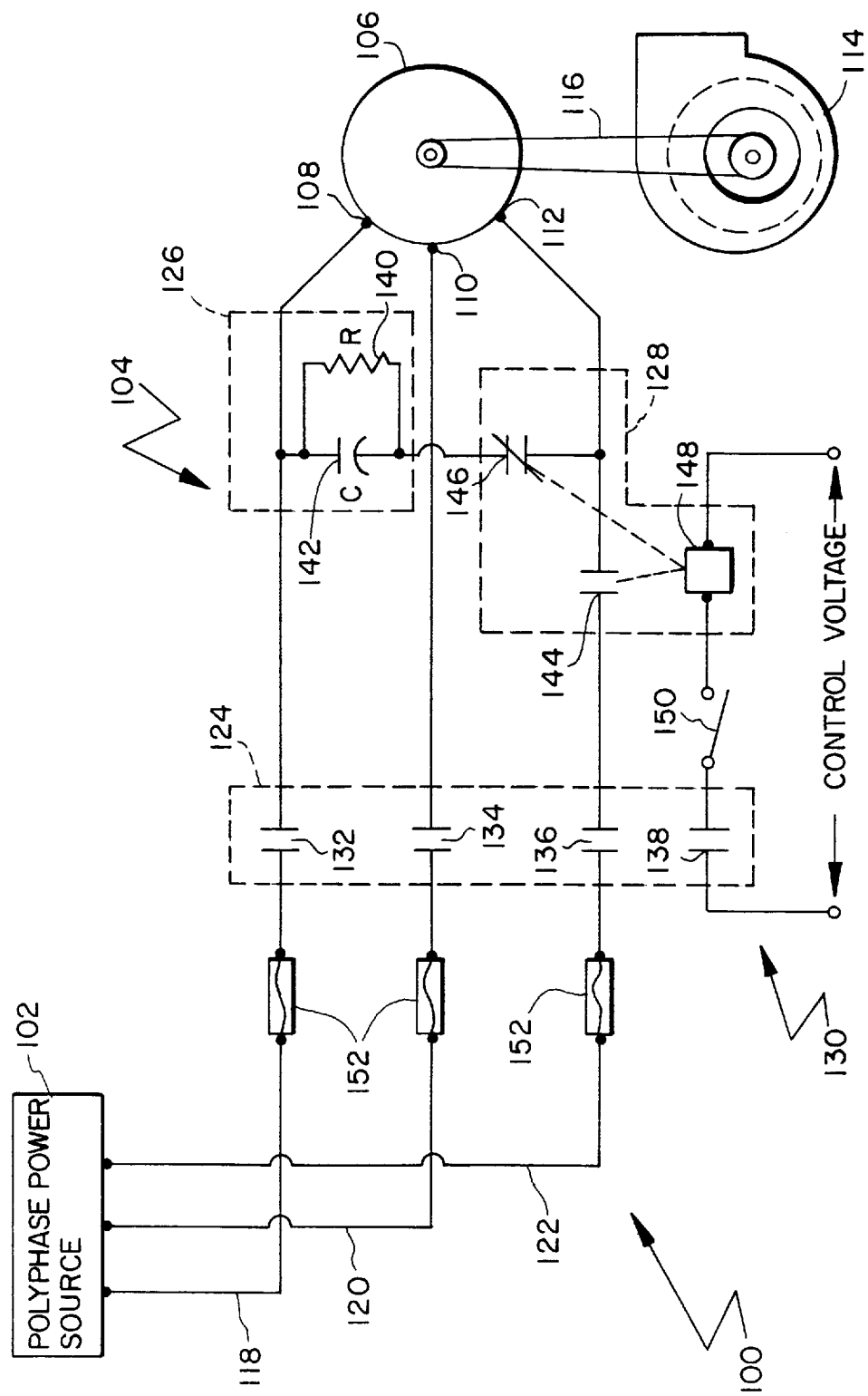

APPARATUS AND METHOD FOR SOFT-STARTING A THREE-PHASE MOTOR

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates generally to an apparatus and method for starting a motor and, more particularly, to an apparatus and method for initially soft-starting a three-phase motor using reduced-phase power, and then switching to three-phase power upon the occurrence of a triggering event.

Many commercial heating, ventilation, and air-conditioning (HVAC) systems circulate air by driving a load such as a fan, pump, or compressor with an electric motor. The motor is connected to a source of electric power. The load may be connected directly to the motor or may be connected by way of load-coupling components, such as a drive belt. Usually, such air circulation systems must be turned on and off on a regular basis to maintain the environment at a desired temperature. Because such systems are typically employed in office or residential settings, high efficiency and low noise are important.

Most of the components of circulation systems, particularly the load, load-coupling components, and motor deteriorate after continued use over a period of time. As these components deteriorate, they must be replaced at a relatively substantial cost. Therefore, other important considerations are the life expectancy and replacement cost of these fan drive components.

In some circulation systems, it is more desirable to employ a polyphase motor instead of a single-phase motor. (As used herein, "polyphase" means three phase or a higher number of phases.) Three-phase motors have many advantages over traditional PSC (permanent split capacitor) motors. For example, the frequency of the voltage delivered to a three-phase motor can be varied while maintaining a constant volts/frequency ratio. This capability allows more efficient motor operation while delivering the motor's rated torque. Other advantages of three-phase motors are: lower locked rotor currents; higher starting torque; lower full load currents; and improved reliability due to the elimination of the starting capacitor required in a PSC motor circuit. A disadvantage of a three-phase motor is its high starting torque. A high starting torque can damage the coupling components or load. For example, the high starting torque of a three-phase motor can cause belt squeal, belt slippage, coupling failure, load deterioration, vibration, motor wear, or other undesirable wear conditions. These problems particularly occur when the motor is heavily loaded at start-up. Furthermore, the efficiency of the motor is compromised by the coupling slippage that may occur as a result of the rapid acceleration of the motor. Thus, notwithstanding the many advantages of three-phase motors, in some situations, motor efficiency can decrease, noise output due to belt squeal, slippage, vibration, or coupling strain can increase, life expectancy due to wear and tear on coupling components and loads can decrease, and replacement costs of coupling components and loads can increase.

Therefore a need remains in the industry for an apparatus and method for soft-starting a three-phase motor which overcomes the potential disadvantages of three-phase motors while exploiting the advantages discussed above. The present invention as described below addresses this need.

BRIEF SUMMARY OF THE INVENTION

One object of the invention is to provide an apparatus and method for soft-starting a three-phase motor.

Yet another object of the invention is to provide an apparatus and method for applying three-phase power to the motor upon the occurrence of a triggering event.

Still another object of the invention is to reduce or eliminate belt squeal, belt slippage, and other unwanted noise during start-up.

A further object of the invention is to increase the life expectancy of coupling components and loads coupled to three-phase motors.

A still further object is to increase the operating efficiency of a three-phase motor by soft-starting the motor.

Another object is to exploit the higher torque of three-phase motors, as compared to conventional PSC motors, without causing damage to or failure of coupling components or loads coupled to the motor.

One or more of the preceding objects, or one or more other objects which will become plain upon consideration of the present specification, are satisfied by the invention described herein.

One aspect of the invention, which addresses one or more of the above objects, is a circuit for soft-starting a three-phase motor. This circuit includes, but is not limited to, first, second, and third conductors (arranged in any order), a phase-shifting element, and switches. The first, second, and third conductors are connected between a power source and the motor. The phase-shifting element is connected between two of the conductors (for one example, the first and third conductors) and is capable of shifting the phase of the power signal normally outputted from the first conductor to substantially match the phase of the power signal normally outputted from the third conductor. One normally open switch allows current to pass from the third conductor to the motor when closed. The other normally closed switch conducts current through the phase-shifting element from the first conductor to the motor when closed.

Yet another aspect of the invention, which addresses one or more of the above objects, is a method for soft-starting a circuit for connection to a polyphase power source for driving a polyphase motor. The method includes the steps of providing at least first, second, and third conductors for conveying polyphase power from a power source to the first, second, and third terminals of the motor; shifting the phase of at least a portion of the power signal normally outputted from the first conductor to substantially match the phase of the power signal normally outputted from the third conductor; and directing the shifted-phase signal to the third terminal of the motor in place of the power signal normally transmitted through the third conductor.

A further aspect of the invention is shown by a method of starting a three phase motor comprising the steps of: applying a first phase of power to a first motor connection using a first conductor; phase shifting a portion of the first phase of power taken from the first conductor; and applying the phase shifted first phase to a second motor connection using a phase shift portion of a second conductor.

An additional aspect of the invention is shown by a starting arrangement for a three phase motor. The starting arrangement comprises: a three phase power source; a three phase motor; and first, second and third connectors operably linking the three phase power source to the three phase motor. Each of the connectors includes a power source end and a motor end. The starting arrangement further comprises a start-up mechanism operably connected between the first and third connectors. The start-up mechanism is operable to shift the phase of power normal to the first conductor to the phase of power normal to the third conductor.

BRIEF DESCRIPTION OF THE DRAWING

The FIGURE shows a schematic view of a soft-start circuit according to the present invention, connected between a polyphase power source and a polyphase motor.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

Referring to the FIGURE, the soft-start system 100 generally comprises a polyphase power source 102, a soft-start circuit 104, and a polyphase motor 106 having contacts 108, 110, and 112. The soft-start circuit 104 can be employed in any system in which it is desirable to start a polyphase motor using reduced-phase power during start-up before switching to polyphase power. Exemplary systems include, but are not limited to, HVAC systems. The invention is illustrated by a polyphase motor 106 coupled to a polyphase power source 102.

A fan 114 is shown connected to the polyphase motor 106 via a fan belt 116. Alternatively, the fan 114 may be directly coupled to the polyphase motor 106. In a preferred embodiment, a commercially available tangential fan (not shown) is directly coupled to the motor. Any coupling component other than a fan belt 116 may be also used. Although a fan 114 is shown, another type of load such as a pump (not shown) or compressor (not shown) may be substituted instead.

The soft-start circuit 104 for a three-phase system comprises a first conductor 118, a second conductor 120, a third conductor 122, a four-contact power switch 124, a phase-shifting element 126, a switching apparatus 128; and a timer element 130. The four-contact power switch 124 includes a first contactor 132, a second contactor 134, and a third contactor 136, and at least one control contactor 138. The phase-shifting element 126 comprises a resistor 140 and a capacitor 142 connected in parallel. The switching apparatus 128 includes a first switch 144, a second switch 146, and a switch actuator 148. Finally, the timer element 130 comprises the control contactor 138, a control switch 150, and the switch actuator 148.

The polyphase power source 102 is connected to the first conductor 118, second conductor 120, and third conductor 122. In the illustrated embodiment, the polyphase power source 102 is capable of delivering three-phase power. Fuses 152 are integrated into the paths of the conductors to prevent overcurrent and damage to the motor 106. Alternatively, instead of providing fuses 152, the polyphase power source 102 could include circuit breakers to prevent overload. The polyphase power source 102 also provides power to the power switch 124 by way of the conductors 118, 120, and 122. Note that the sum of the voltages across the first conductor 118, second conductor 120, and third conductor 122 at every instance of time is equal to zero, a property common to polyphase systems.

The power switch 124 is a four-pole contactor comprising three power contactors 132, 134, 136 and at least one control contactor 138. A contactor is essentially a heavy-duty relay having a high amperage rating. Note that relays may be employed instead of contactors for systems requiring relatively low amperage. The power switch 124 may be controlled manually by an operator (not shown) or may be controlled from a remote location at a control panel (not shown) or by a computer (not shown) including building automation systems and individual controllers sold by The Trane Company under the trademark Tracer Sumit, UPCM, UCP, PCM, TUC and others. In this embodiment, all four contactors 132, 134, 136, 138 of the power switch 124 open and close simultaneously. Alternatively, the control contactor 138 could be operated independent of the other three contactors shown in the FIGURE.

The phase-shifting element 126 is connected between the first conductor 118 and third conductor 122. In an alternative embodiment, the phase-shifting element could be connected between any two of the three conductors. The activation of the phase-shifting element 126 is controlled by the status of the first switch 144 and second switch 146 of the switching apparatus 128. The switching apparatus 128 is essentially a single pole double throw (SPDT) switch.

When activated, the phase-shifting element 126 substantially matches the phase of a portion of the power signal normally outputted from the first conductor 118 to the phase of the power signal normally outputted from the third conductor 122. The phase-matching aspect of the phase-shifting element 126 is accomplished by selecting a value for the resistor 140 and capacitor 142 such that the power signals of the first conductor 118 and third conductor 122 are substantially identical in phase. In one embodiment, for a motor 106 with a 0.75 HP rating, the value of the resistor 140 is 15 kW and the value of the capacitor 142 is 15 mF. The value of the capacitor is dependent upon a number of factors, including, for example, the locked rotor impedance, the capacitive reactance obtained from the motor winding resistance (usually provided by the motor manufacturer), the value of the resistor 140, and the rating of the motor 106. The value of the capacitor 142 can be determined empirically according to the particular requirements of an application of the present invention. However, the value could be determined using conventional analog circuit analysis known to those of ordinary skill in the art.

Turning now to the switching apparatus 128, a first switch 144 and a second switch 146 are shown. The first switch 144 is normally open and the second switch 146 is normally closed. In this embodiment, the first switch 144 and the second switch 146 are in opposite states; i.e., whenever the first switch 144 is in an open state, the second switch 146 is in a closed state, and vice versa. When the switch actuator 148 is energized, the respective states of the switches 144 and 146 flip-flop.

The timer 130 comprises an control contactor 138, a timer controlled switch 150, and a switch actuator 148. A control voltage is applied across the control contactor 138 (when closed) and the timer controlled switch 150 (when closed) to provide current to the switch actuator 148. In the illustrated embodiment, when the control contactor 138 is closed, the timer controlled switch 150 closes after a predetermined period of time, thereby energizing the switch actuator 148. Note that the passage of time is not the only event (and thus a timer is not the only apparatus) that may be used to control the activation of the control switch 150. The control switch 150 can be triggered upon the occurrence of any other event, including but not limited to, motor speed, temperature changes, manual user activation, load changes on the motor, motion detection, light sensing, or other pertinent events.

In operation of the illustrated embodiment, initially the power switch 124 (including the control contactor 138), the control switch 150, and the first switch 144 are open (i.e., no current flows along the conductors 118, 120, or 124 or through the timer 130), the second switch 146 is closed, and the motor 106 is off.

When the power switch 124 is activated to soft-start the motor, the first conductor 118 and second conductor 120 are energized. Because the first switch 144 is then open, no current flows along the third conductor 122 from the polyphase power source 102 through the first switch 144 at this stage. The second conductor 120 is connected to the motor 106 just as it would be during normal operation. The power delivered by the first conductor 118 is split into two portions. A first portion of the power delivered by the first conductor 118 is delivered directly to the motor 106, as during normal operation. A second portion of the power delivered by the first conductor 118 is shunted through the phase-shifting element 126 to the motor 106 in place of the power normally delivered via the third conductor 122 from the power source 102. As a result, some electrical power is delivered to each of the three terminals of the motor 106, but the amount of electrical power delivered is less than normal. As a result, the motor develops less mechanical power than normal and accelerates from a standstill more slowly.

This reduced-phase or soft-start operation of the motor reduces the torque of the motor, thus preventing unnecessary wear and tear on the motor itself and on the various coupling components and loads connected to it. Without soft-starting the motor, coupling components or loads could be damaged or deteriorated and motor life could be decreased due to the high starting torque of a three-phase motor. The activation of the power switch 124 also activates the control contactor 130 which causes the timer controlled switch 150 to measure out a time delay.

In one embodiment, the timer controlled switch 150 times out after four seconds following closing of the control contactor 138, thereby closing the control switch 150. The optimal time delay for the control switch 150 to close depends on the load (such as the fan 114) attached to the polyphase motor 106 and how long it takes the polyphase motor 106 to reach a desired speed. Upon the expiration of the predetermined period of time, the timer controlled switch 150 closes, which energizes the switch actuator 148. When the switch actuator 148 is energized, the first switch 144 closes while the second switch 146 simultaneously opens. The opening of the second switch 146 drops out the phase-shifting element 126, so current no longer flows from the first conductor 118 through the phase-shifting element 126 to the third conductor 122. Once the first switch 144 is closed and the second switch 146 is opened, current flows freely from the third conductor 122 to the motor 106. At this stage, the motor 106 runs in three-phase mode, at full power.

To turn off the motor 106, the contacts controlled by the power switch 124 are opened. Deactivation of the power switch 124 deactivates the control contactor 138 which de-energizes the switch actuator 148. When the switch actuator 148 no longer receives power, the first switch 144 reverts to its normally open state and the second switch 146 reverts to its normally closed state. Thus, when the polyphase motor 106 is turned off, the contactors 124, 138, and 128 and the control switch 150 return to the normal states they were in before the motor was started up.

What has been disclosed is a starting arrangement for a three phase motor having a three phase power supply and three conductors connecting the motor to the power supply in a run mode of operation. In a start-up mode of operation, an isolation mechanism isolates one of the three phases from the power supply while a phase shift mechanism phase shifts a portion of the non-isolated phase and applies that phase shifted portion to the isolated phase. Effectively, the non-isolated phase is applied to one motor connection and the phase shifted portion is applied to another motor connection. It is apparent that a person of skill in the art will perceive many modifications, variations and alterations in the present invention. It is intended that all such modifications, variations and alterations fall within the spirit and scope of the atached claims.

What is claimed is:

1. A soft-start circuit for connection to a polyphase power source for driving a polyphase motor having at least first, second, and third contacts, said circuit comprising:

at least first, second, and third conductors for conveying polyphase electric power from the power source to the respective contacts of the motor;

a phase-shifting element connected between said first and third conductors for shifting the phase of the power signal normally outputted from said first conductor to substantially match the phase of the power signal normally outputted from said third conductor; and at least first and second switches, said switches having open and closed states, said first switch being normally open and providing current flow from said first conductor to the third motor contact via said phase-shifting element when said first switch is in said closed state, and said second switch being normally closed and allowing current flow from said third conductor to the third motor contact only when said second switch is in said closed state.

2. The soft-start circuit of claim 1 further comprising a power switch coupled to at least some of said conductors for providing current from the power source to the motor when said power switch is closed.

3. The soft-start circuit of claim 1 further comprising:

a control element for controlling said switching apparatus by reversing said states of said switch elements.

4. The soft-start circuit of claim 1 further comprising:

a timer element for controlling said switching apparatus by reversing the states of said switch elements after a period of time following closing of said power switch.

5. The soft-start circuit of claim 1 further comprising:

a reset element for closing said first switch element and opening said second switch element.

6. The switching element of claim 1 wherein said first switch element prevents current flow from said first conductor to the third motor contact via said phase-shifting element when said first switch element is in said open state, and said second switch element provides current from said third conductor to the third motor contact when said second switch element is in said closed state.

7. The switching element of claim 1 wherein said first switch element is linked to said second switch element such that when said first switch element is in said closed state, said second switch element is in said open state.

8. The switching element of claim 1 wherein said first switch element is linked to said second switch element such that when said first switch element is in said open state, said second switch element is in said closed state.

9. A method for soft-starting a circuit for connection to a polyphase power source for driving a polyphase motor having at least first, second, and third contacts, said method comprising the steps of:

providing at least first, second, and third conductors for conveying polyphase electric power from the power source to the respective contacts of the motor;

shifting the phase of at least a portion of the power signal normally outputted from said first conductor to substantially match the phase of the power signal normally outputted from said third conductor; and directing the phase-shifted power signal to the third contact of the motor in place of the power signal normally transmitted through said third conductor.

10. The method of claim 9 further comprising the subsequent steps of disconnecting said shifted-phase signal and reconnecting said third conductor signal to the third terminal of the motor after the motor has been soft-started.

11. The method of disconnecting and reconnecting of claim 10 further comprising the step of delaying said disconnecting and reconnecting steps for a predetermined period of time following the beginning of said directing step.

12. A method of starting a three phase motor comprising the steps of:

applying a first phase of power to a first motor connection using a first conductor;

phase shifting a portion of the first phase of power taken from the first conductor; and applying the phase shifted first phase to a second motor connection using a phase shift portion of a second conductor.

13. The method of claim 12 wherein the phase shifting step includes the further steps of:

arranging a capacitor and a resistor in parallel and operably linking the arranged capacitor and resistor between the first and second conductors.

14. The method of claim 13 including the further steps of:

providing a normally open switch in the operable link and closing the normally open switch during start-up.

15. The method of claim 14 including the further steps of:

providing a normally closed switch in the second conductor between the phase shift portion and a power providing portion of the second conductor, and opening the normally closed switch during start-up.

16. A starting arrangement for a three phase motor comprising:

a three phase power source;

a three phase motor;

first, second and third conductors operably linking the three phase power source to the three phase motor, each of the conductors including a power source end and a motor end; and a start-up mechanism operably connected between the first and third conductors, the start-up mechanism being operable to shift the phase of power normal to the first conductor to the phase of power normal to the third conductor.

17. The starting arrangement of claim 16 further including an isolation mechanism operably associated with the third conductor and the start-up mechanism, the isolation mechanism being operable to isolate the start-up mechanism during a motor run mode of operation and being operable to isolate the power source end of the third conductor from the motor source end of the third conductor during a motor start-up mode of operation.

18. The starting arrangement of claim 17 wherein the isolation mechanism includes a first switch in the third conductor and includes a second switch in series with the start-up mechanism.

19. The starting arrangement of claim 18 wherein the start-up mechanism includes a capacitor in parallel with a resistor and wherein the second switch is serially arranged with the capacitor and resistor and is normal open.

20. The starting arrangement of claim 19 wherein the first switch is normally closed and is located to isolate the power source end of the third conductor from the motor source end of the third conductor and from the operable connection of the start-up mechanism.

* * * * *